United States Patent
Kamada et al.

(10) Patent No.: US 11,332,643 B2
(45) Date of Patent: May 17, 2022

(54) ADHESIVE MEMBER AND PRODUCTION METHOD FOR ADHESIVE MEMBER

(71) Applicant: MITSUI CHEMICALS, INC., Tokyo (JP)

(72) Inventors: Jun Kamada, Narashino (JP); Tomoya Matayoshi, Ichihara (JP); Michio Eriguchi, Chiba (JP); Kaichiro Haruta, Ichihara (JP); Kenichi Fujii, Yokohama (JP); Takashi Unezaki, Ichihara (JP); Kazuo Kohmura, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 14 days.

(21) Appl. No.: 16/629,719

(22) PCT Filed: Jul. 10, 2018

(86) PCT No.: PCT/JP2018/026049
§ 371 (c)(1),
(2) Date: Jan. 9, 2020

(87) PCT Pub. No.: WO2019/017247
PCT Pub. Date: Jan. 24, 2019

(65) Prior Publication Data
US 2020/0181457 A1  Jun. 11, 2020

(30) Foreign Application Priority Data
Jul. 20, 2017 (JP) .............................. JP2017-141173

(51) Int. Cl.
*C09J 7/25* (2018.01)
*B32B 3/30* (2006.01)
(Continued)

(52) U.S. Cl.
CPC ............... *C09J 7/25* (2018.01); *B32B 3/30* (2013.01); *B32B 7/022* (2019.01); *B32B 7/12* (2013.01);
(Continued)

(58) Field of Classification Search
CPC ..... C09J 7/25; C09J 7/381; C09J 7/241; C09J 7/38; C09J 2423/00; C09J 2423/006;
(Continued)

(56) References Cited

U.S. PATENT DOCUMENTS

| 8,206,631 | B1 * | 6/2012 | Sitti | ........................ B29C 41/20 264/255 |
| 2002/0058127 | A1 | 5/2002 | Itada et al. | |
| 2010/0092730 | A1 * | 4/2010 | Tomino | ...................... C09J 7/22 428/161 |

FOREIGN PATENT DOCUMENTS

| JP | H11267153 A | 10/1999 |
| JP | 2007169469 A | 7/2007 |

(Continued)

OTHER PUBLICATIONS

Del Campo, et al., "Patterned Surfaces with Pillars with Controlled 3D Tip Geometry Mimicking Bioattachment Devices", Advanced Materials, 19, pp. 1973-1977, 2007.
International Search Report (PCT/ISA/210) dated Sep. 11, 2018, by the Japan Patent Office as the International Searching Authority for International Application No. PCT/JP2018/026049.
(Continued)

*Primary Examiner* — David Sample
*Assistant Examiner* — Donald M Flores, Jr.
(74) *Attorney, Agent, or Firm* — Buchanan Ingersoll & Rooney PC

(57) ABSTRACT

Provided is an adhesive member including: a base material having an uneven shape on at least one surface; and a surface
(Continued)

layer covering at least a portion of the surface having the uneven shape on the base material.

12 Claims, 11 Drawing Sheets

(51) Int. Cl.
*B32B 7/022* (2019.01)
*B32B 27/08* (2006.01)
*B32B 27/32* (2006.01)
*C09J 7/24* (2018.01)
*C09J 7/38* (2018.01)
*B32B 7/12* (2006.01)

(52) U.S. Cl.
CPC .............. *B32B 27/08* (2013.01); *B32B 27/32* (2013.01); *C09J 7/241* (2018.01); *C09J 7/38* (2018.01); *C09J 7/381* (2018.01); *B32B 2405/00* (2013.01); *C09J 2423/00* (2013.01); *C09J 2423/006* (2013.01); *C09J 2483/00* (2013.01); *C09J 2483/006* (2013.01); *Y10T 428/24182* (2015.01)

(58) Field of Classification Search
CPC .............. C09J 2483/00; C09J 2483/006; C09J 2301/31; C09J 7/00; C09J 7/20; C09J 201/00; C09J 2301/40; C09J 2301/312; C09J 2301/206; B32B 7/022; B32B 3/30; B32B 7/12; B32B 27/08; B32B 27/32; B32B 2405/00; B32B 7/02; Y10T 428/24182
See application file for complete search history.

(56) References Cited

FOREIGN PATENT DOCUMENTS

| | | |
|---|---|---|
| JP | 2008201883 A | 9/2008 |
| JP | 2011032331 A | 2/2011 |
| JP | 2015-201602 A | 11/2015 |
| JP | 2015202609 A | 11/2015 |
| KR | 10-2016-0076665 A | 7/2016 |
| WO | 02/20366 A1 | 3/2002 |
| WO | 2008075767 A1 | 6/2008 |
| WO | 2008076391 A2 | 6/2008 |
| WO | 2014124352 A1 | 8/2014 |

OTHER PUBLICATIONS

Written Opinion (PCT/ISA/237) dated Sep. 11, 2018, by the Japan Patent Office as the International Searching Authority for International Application No. PCT/JP2018/026049.
Glassmaker, N. .J et al: "Biologically inspired crack trapping for enhanced adhesion", Proceedings of the National Academy of Sciences, vol. 104 No. 26, Jun. 26, 2007, pp. 10786-10791, XP055760844, ISSN: 0027-8424, DOI: 10. 1073/pnas.0703762104.
Kustandi, T. S. et al: "Reversible Recovery of Nanoimprinted Polymer Structures", LANGMUIR, vol. 29, No. 33, Aug. 20, 2013, pp. 10498-10504, XP055176299, ISSN: 0743-7463, DOI: 10.1021/la401621j.
Murphy, P. M. et al: "Enhanced Adhesion by Gecko-Inspired Hierarchical Fibrillar Adhesives", ACS Applied Materials & Interfaces, vol. 1. No. 4, Apr. 29, 2009, pp. 849-855, XP055254687, US ISSN: 1944-8244, DOI: 10.1021/am8002439.

* cited by examiner

Comparative adhesive tape 4

Comparative adhesive tape 5

ADHESIVE MEMBER AND PRODUCTION METHOD FOR ADHESIVE MEMBER

TECHNICAL FIELD

The present invention relates to an adhesive member, and a method of producing the same.

BACKGROUND ART

Generally, for adhesion of a base material and an adherend, an adhesive layer is formed on a surface of the base material, and the base material is adhered to the adherend by a chemical action with the adherend, such as hydrogen bonding, ionic bonding, or electrical interaction. As an adhesive, for example, an acrylic adhesive or a silicone-based adhesive is used.

However, when a base material and an adherend are adhered with the use of an adhesive, it tends to be more difficult with time to peel off the adhesive, or heating tends to make it difficult to peel off the adhesive. In addition, there is a problem that the adhesive remains on the adherend when the adhesive is peeled off from the adherend.

Thus, it has been studied to adhere a base material and an adherend by utilizing a physical action, such as a van der Waals force or an atmospheric pressure. When a base material and an adherend are adhered utilizing a physical action, the adhesive strength largely varies depending on the direction of a force applied thereto. Accordingly, studies have also been conducted on adhesive members that can be strongly adhered and easily detached depending on the direction of a force applied thereto, i.e. adhesive members whose adhesive strength has a directional dependence. Such adhesive members do not remain on an adherend and can thus be reused as well.

It is known that the adhesive strength of geckos' feet has a directional dependence, and that a gecko utilizes this feature and walks by repeating adhesion and detachment of its feet. Accordingly, several examples of an artificial adhesive member mimicking a microstructure of a gecko's footpad surface have been reported.

As artificial adhesive members mimicking a microstructure of a gecko's footpad surface, for example, adhesive members that include cylindrically-shaped or mushroom-shaped fine protrusions arranged on a side coming into contact with an adherend have been disclosed (see, for example, Patent Document 1 and Non-patent Document 1).
[Patent Document 1] WO 2014/124352
[Non-patent Document 1] "Patterned Surfaces with Pillars with Controlled 3D Tip Geometry Mimicking Bioattachment Devices" Adv. Mater. 19, 1973-1977 (2007)

SUMMARY OF THE INVENTION

Technical Problem

In addition to such adhesive members as those disclosed in Patent Document 1 and Non-patent Document 1 that are provided with cylindrically-shaped or mushroom-shaped fine protrusions, there is a demand for an adhesive member that has excellent productivity and exhibits excellent adhesion with an adherend.

An object of one aspect of the invention is to provide: an adhesive member that exhibits excellent adhesion with an adherend; and a method of producing of the same.

Solution to Problem

Specific means for solving the above described problems are as follows.

<1> An adhesive member comprising: a base material having an uneven shape on at least one surface; and a surface layer covering at least a portion of the surface having the uneven shape on the base material.

<2> The adhesive member according to <1>, wherein: the surface layer is arranged over tips of plural protrusions on the base material, and a bottom surface between two adjacent protrusions of the plural protrusions, and a surface of the surface layer that is on a side facing the bottom surface, have a space therebetween.

<3> The adhesive member according to <1> or <2>, wherein a ratio of a height of each protrusion on the base material with respect to a thickness of the surface layer (height of each protrusion/thickness of surface layer) is from 0.2 to 1,000.

<4> The adhesive member according to any one of <1> to <3>, wherein a thickness of the surface layer is from 0.1 μm to 50 μm.

<5> The adhesive member according to any one of <1> to <4>, wherein a width of each protrusion on the base material is from 0.1 μm to 200 μm.

<6> The adhesive member according to any one of <1> to <5>, wherein a distance between adjacent protrusions on the base material is from 0.1 μm to 500 μm.

<7> The adhesive member according to any one of <1> to <6>, wherein a height of each protrusion on the base material is from 0.1 μm to 200 μm.

<8> The adhesive member according to any one of <1> to <7>, wherein the base material and the surface layer comprise the same material.

<9> The adhesive member according to any one of <1> to <8>, wherein a storage elastic modulus of the surface layer is less than a storage elastic modulus of the base material.

<10> The adhesive member according to any one of <1> to <9>, wherein the surface layer and the base material have a storage elastic modulus of from 1 MPa to 1 GPa.

<11> The adhesive member according to any one of <1> to <10>, wherein the surface layer and the base material have a tackiness of 25 N/cm$^2$ or less.

<12> The adhesive member according to any one of <1> to <11>, being in the form of a tape, a sheet, or a film.

<13> A method of producing the adhesive member according to any one of <1> to <12>, the method comprising: preparing a base material having an uneven shape on at least one surface; and pasting a surface layer, which covers at least a portion of the surface having the uneven shape on the base material, to the base material.

Effects of Invention

According to one aspect of the invention, an adhesive member that exhibits excellent adhesion with an adherend, and a method of producing of the same can be provided.

DESCRIPTION OF EMBODIMENTS

Mode for Carrying Out the Invention

In the present disclosure, those numerical ranges that are stated with "to" each denote a range that includes the numerical values stated before and after "to" as the lower and upper limit values, respectively.

In a set of numerical ranges that are stated stepwise in the disclosure, the upper limit value or the lower limit value of a numerical range may be replaced with an upper limit value or a lower limit value of other numerical range. Further, in a numerical range stated in the disclosure, the upper limit or the lower limit of the numerical range may be replaced with a relevant value indicated in any of Examples.

Embodiments of the invention are described below in detail. It is noted here, however, that the invention is not restricted to the below-described embodiments. In the below-described embodiments, the constituents thereof are not indispensable unless otherwise specified. The same applies to the numerical values and ranges thereof, without restricting the invention.

[Adhesive Member]

The adhesive member according to one embodiment of the invention includes: a base material having an uneven shape on at least one surface; and a surface layer covering at least a portion of the surface having the uneven shape on the base material. The adhesive member of the present embodiment exhibits excellent adhesion with an adherend. The surface layer may cover the entirety of the surface having the uneven shape, or may cover only a portion of the surface having the uneven shape. The adhesion, the re-peelability and the like can be controlled by adjusting the covering ratio of the surface layer.

The adhesive member of the present embodiment may be capable of semipermanently maintaining adhesion with an adherend or, since its adhesiveness has an anisotropy, the adhesion with an adherend may be released with an application of a force in a specific direction or by stimulating the adhesive member with UV radiation, heat or the like.

Further, it is preferred that the adhesive member of the present embodiment does not remain on an adherend when the adhesion with the adherend is released, and that the adhesive member can be adhered again with the adherend after the adhesion with the adherend is released.

A shape of the adhesive member is not particularly restricted as long as the adhesive member can exert its adhesiveness with an adherend when a surface of the surface layer that is opposite to the side facing the uneven shape is brought into contact with the adherend, and the adhesive member may be in the form of, for example, a tape, a sheet, or a film.

Figure 1:
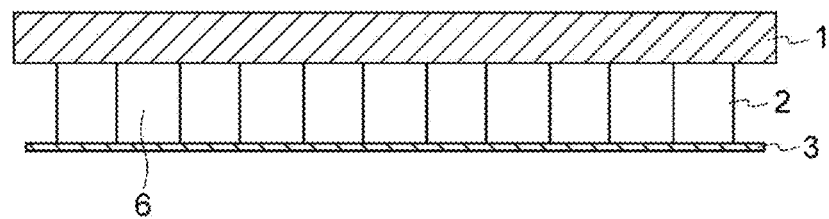
FIG. 1 is a schematic structural view illustrating an adhesive member according to one embodiment of the invention.

The adhesive member of the present embodiment includes, for example, as illustrated in FIG. 1: a base material 1 having an uneven shape (protrusions 2 and recesses 6) formed on one surface; and a surface layer 3 covering the surface having the uneven shape.

In the disclosure, the "uneven shape" is constituted by plural protrusions and regions (recesses) between two adjacent protrusions of the plural protrusions.

(Base Material)

The adhesive member of the present embodiment includes a base material having an uneven shape on at least one surface. For example, the uneven shape may be formed on at least one main surface (a surface with the largest area), or the uneven shape may be formed on two main surfaces.

The protrusions on the base material are not particularly restricted and may have any shape, such as a cylindrical shape, a conical shape, a tapered shape, a reverse tapered shape, a cuboid shape, a polygonal column shape, a mushroom shape, or a dumbbell shape. Further, the central axes of the protrusions on the base material may be tilted with respect to the vertical direction.

A width of each protrusion on the base material is preferably from 0.1 µm to 200 µm, more preferably from 0.5 µm to 100 µm, still more preferably from 1 µm to 20 µm, particularly preferably from 2 µm to 10 µm.

The term "width of each protrusion" used herein refers to a length at which the distance between two parallel planes sandwiching the periphery of the bottom part of each protrusion is the largest.

For example, when the protrusions have a cylindrical shape or a conical shape, the diameter of their bottom parts corresponds to the "width of each protrusion"; when the protrusions have a cuboid shape, the diagonal length of their bottom parts corresponds to the "width of each protrusion"; and when the protrusions have a triangular prism shape, a maximum value of the distance between one side of a bottom part and an apex of the bottom part that does not constitute the one side corresponds to the "width of each protrusion".

A distance between adjacent protrusions on the base material is preferably from 0.1 µm to 500 µm, more preferably from 1 µm to 100 µm, still more preferably from 2 µm to 50 µm.

The term "distance between adjacent protrusions" used herein refers to a length at which the distance between the side surfaces of two adjacent protrusions is the shortest.

A height of each protrusion on the base material is preferably from 0.1 µm to 200 µm, more preferably from 1 µm to 100 µm, still more preferably from 2 µm to 50 µm.

A ratio of the height of each protrusion with respect to the width of each protrusion (height of each protrusion/width of each protrusion) is preferably from 1 to 15, more preferably from 1.5 to 10, still more preferably from 2 to 5. When the ratio of the height of each protrusion with respect to the width of each protrusion is 1 or higher, superior adhesion with an adherend tends to be attained, while when the ratio of the height of each protrusions with respect to the width of each protrusion is 15 or lower, the protrusions tend to have excellent strength.

A ratio of the distance between adjacent protrusions with respect to the width of each protrusion (distance between adjacent protrusion/width of each protrusion) is preferably from 0.05 to 10, more preferably from 0.1 to 5, still more preferably from 0.2 to 2.

From the standpoints of the adhesion and the shape retainability of the adhesive member, a total area ratio of the bottom surfaces of the recesses with respect to a total area of the bottom parts of the protrusions (total area of bottom surfaces of recesses/total area of bottom parts of protrusions) is preferably from 1 to 100, more preferably from 1.5 to 50, still more preferably from 2 to 20.

From the standpoints of the adhesion and the shape retainability of the adhesive member, a proportion (volume ratio) of the protrusions with respect to a region occupied by the uneven shape in the adhesive member (a total of regions occupied by the protrusions and the region occupied by the recesses) is preferably from 0.0001 to 0.5, more preferably from 0.02 to 0.4, still more preferably from 0.05 to 0.33.

The surface having the uneven shape on the base material is at least partially covered with the below-described surface layer, and the surface having the uneven shape on the base material is preferably covered with the below-described surface layer. In other words, it is preferred that the surface layer is arranged on the tips of the protrusions of the base material. It is not necessary that the surface having the uneven shape on the base material is entirely covered with the surface layer and, when viewed from the side of the tips of the protrusions of the base material, a portion of the uneven shape does not have to be covered with the surface layer.

On the base material, at least a portion of the surface having the uneven shape may be covered with two or more surface layers existing separately from one another, or the surface having the uneven shape may be covered with two or more surface layers existing separately from one another.

A material contained in the base material having the uneven shape is not particularly restricted, and examples thereof include resins, such as olefin-based resins, polyester-based resins, polyurethane-based resins, polyimide resins, silicone-based resins, styrene-based resins, acrylic resins, amide-based resins, ester-based resins, and carbonate-based resins. Thereamong, from the standpoint of retaining the shape of the protrusions, olefin-based resins, polyurethane-based resins, polyimide resins and silicone-based resin are preferred.

From the standpoints of retaining the shape of the protrusions and reducing the stickiness, the base material having the uneven shape is preferably formed from a material having a high elastic modulus and a low tackiness.

From the standpoint of satisfying both imprint processability and adhesiveness, the base material has a storage elastic modulus at 25° C. of preferably from 1 MPa to 1 GPa, more preferably from 5 MPa to 1 GPa, still more preferably from 10 MPa to 50 MPa.

The storage elastic modulus of the base material can be determined by preparing a test piece made of the material contained in the base material and measuring the storage elastic modulus of this test piece in accordance with the method described below in the section of Examples.

The base material has a tackiness of preferably 25 N/cm$^2$ or less, more preferably 20 N/cm$^2$ or less, still more preferably 10 N/cm$^2$ or less. The tackiness of the base material may be 0.1 N/cm$^2$ or higher, or 0.3 N/cm$^2$ or higher.

The tackiness of the base material can be determined by preparing a test piece made of the material contained in the base material and measuring the tackiness of this test piece in accordance with the method described below in the section of Examples.

The base material having the uneven shape may be formed by, for example, patterning protrusions on a surface of the base material using a nanoimprint technology.

Further, the base material having the uneven shape may contain a stimuli-responsive substance whose chemical structure is modified with an application of a stimulus, such as UV (ultraviolet ray) or heat. By this, for example, the adhesive member can be configured such that adhesion thereof with an adherend is released by an application of a stimulus, such as UV or heat, to the base material included in the adhesive member.

(Surface Layer)

The adhesive member of the present embodiment includes a surface layer covering at least a portion of the surface having an uneven shape on the base material. The surface layer may have any configuration as long as it is arranged on the tips of the protrusions of the base material to cover at least a portion of the surface having the uneven shape.

It is preferred that the surface layer is arranged over the tips of plural protrusions on the base material and, for example, the surface layer may be arranged over the tips of ten or more protrusions on the base material. The phrase "the surface layer is arranged over the tips of plural protrusions on the base material" used herein means that at least one surface layer is arranged over the tips of plural protrusions. The surface layer is preferably a continuous layer that is arranged over the tips of plural protrusions and covers the plural protrusions. The adhesive member of the present embodiment may also have plural surface layers that are arranged over the tips of plural protrusions. When the adhesive member of the present invention includes plural surface layers, it is preferred that the plural surface layers exist separately from one another and are each arranged over the tips of plural protrusions.

In the adhesive member of the present embodiment, from the standpoint of its adhesiveness, it is preferred that a bottom surface between two adjacent protrusions of the plural protrusions and a surface of the surface layer on the side facing the bottom surface have a space therebetween. This space may be deformed when the adhesive member of the present embodiment is adhered to an adherend.

A ratio of the height of each protrusion on the base material with respect to the thickness of the surface layer (protrusion height/surface layer thickness) is preferably from 0.2 to 1,000, more preferably from 0.5 to 500, still more preferably from 1.0 to 100.

From the standpoint of further improving the adhesion with an adherend, the thickness of the surface layer is preferably from 0.1 µm to 50 µm, more preferably from 3 µm to 20 µm, still more preferably from 5 µm to 15 µm.

A material contained in the surface layer is not particularly restricted, and examples thereof include resins, such as olefin-based resins, polyester-based resins, polyurethane-based resins, polyimide resins, silicone-based resins, styrene-based resins, acrylic resins, amide-based resins, ester-based resins, and carbonate-based resins. Thereamong, from the standpoint of attaining superior adhesion with an adherend, the material is preferably an olefin-based resin or a silicone-based resin.

From the standpoints of retaining the shape of the protrusions and reducing the stickiness, the surface layer is preferably formed from a material having a high elastic modulus and a low tackiness.

The surface layer has a storage elastic modulus at 25° C. of preferably from 1 MPa to 1 GPa, more preferably from 5 MPa to 1 GPa, still more preferably from 10 MPa to 50 MPa. In addition, the storage elastic modulus at 25° C. of the surface layer is preferably less than the storage elastic modulus at 25° C. of the base material.

The storage elastic modulus of the surface layer can be determined by preparing a test piece made of the material contained in the surface layer and measuring the storage elastic modulus of this test piece in accordance with the method described below in the section of Examples.

The surface layer has a tackiness of preferably 25 N/cm$^2$ or less, more preferably 20 N/cm$^2$ or less, still more preferably 10 N/cm$^2$ or less. The tackiness of the surface layer may be 0.1 N/cm$^2$ or higher, or 0.3 N/cm$^2$ or higher.

The tackiness of the surface layer can be determined by preparing a test piece made of the material contained in the surface layer and measuring the tackiness of this test piece in accordance with the method described below in the section of Examples.

The base material and the surface layer may contain the same material, for example, a silicone-based resin. Further, the base material and the surface layer may be made of the same material, for example, a silicone-based resin.

Figure 2A:
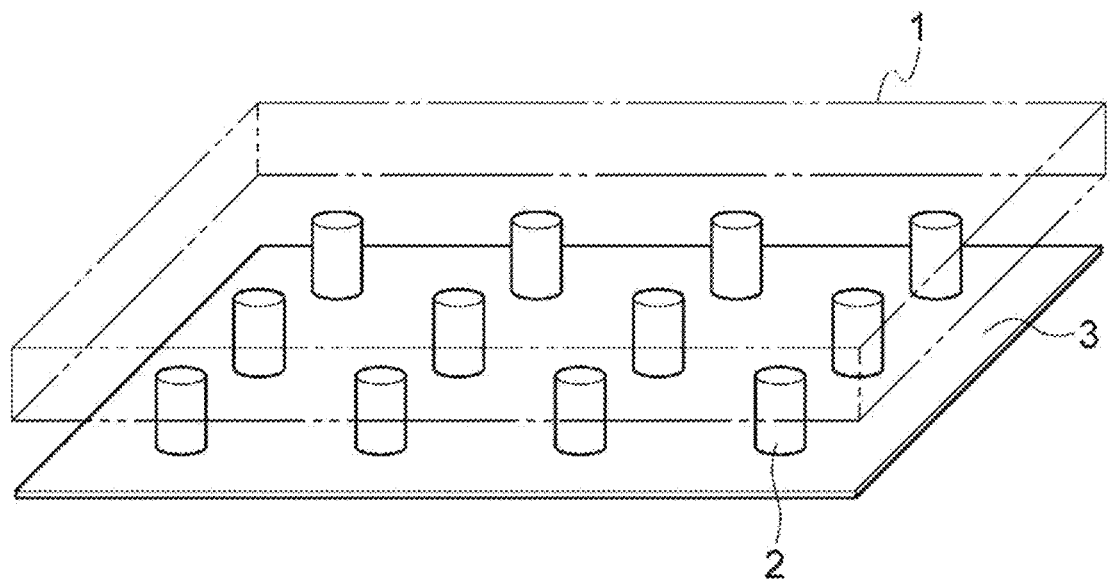
FIG. 2A provides schematic structural views illustrating an adhesive member in which protrusions having a smaller width are arranged.
Figure 2B:
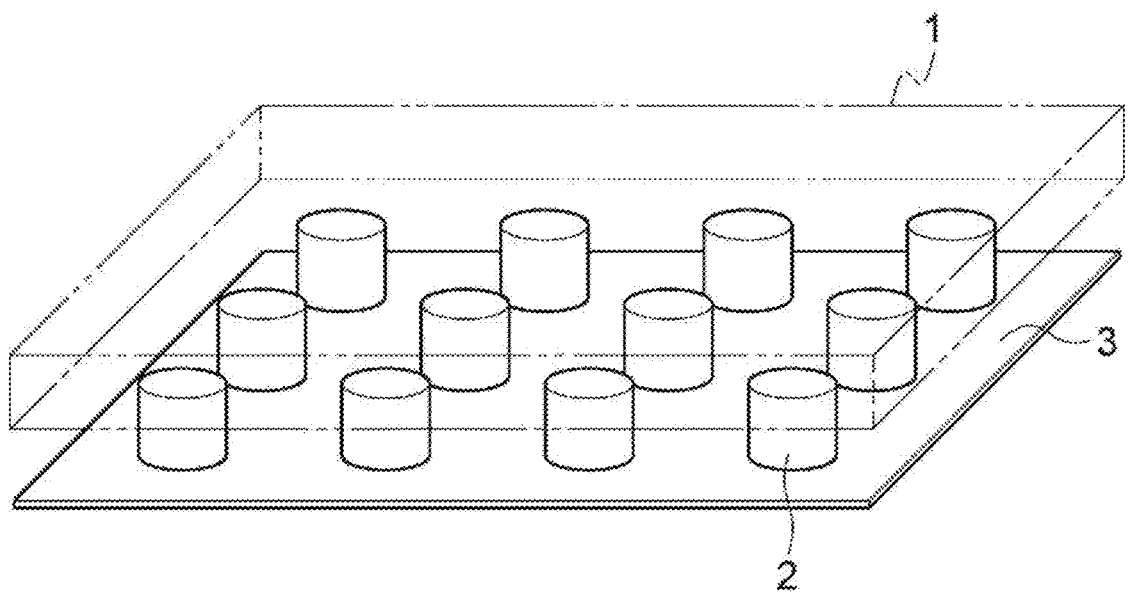
FIG. 2B provides schematic structural views illustrating an adhesive member in which protrusions having a larger width are arranged.

With regard to the protrusions on the base material, by reducing the proportion of the protrusions in a region occupied by the uneven shape, the adhesion with an adherend can be improved. For example, by reducing the width of each protrusion or by sparsely arranging the protrusions, the adhesion of the surface layer with an adherend can be improved as compared to a case of increasing the width of each protrusion or densely arranging the protrusions. More specifically, by reducing the width of each protrusion 2 and thereby lowering the proportion of the protrusions 2 as illustrated in FIG. 2A, the adhesion of the surface layer 3 with an adherend can be improved as compared to a case of increasing the width of each protrusion 2 and thereby increasing the proportion of the protrusions 2 as illustrated in FIG. 2B.

Figure 3A:
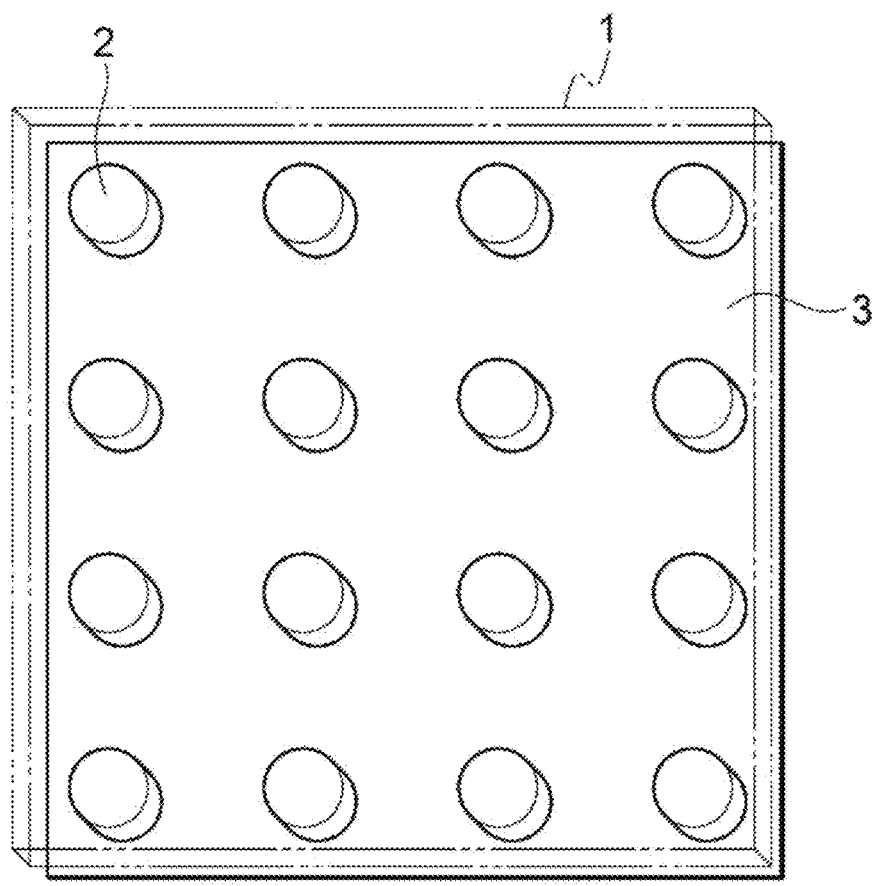
FIG. 3A provides schematic structural views illustrating an adhesive member in which protrusions are arranged without anisotropy.
Figure 3B:
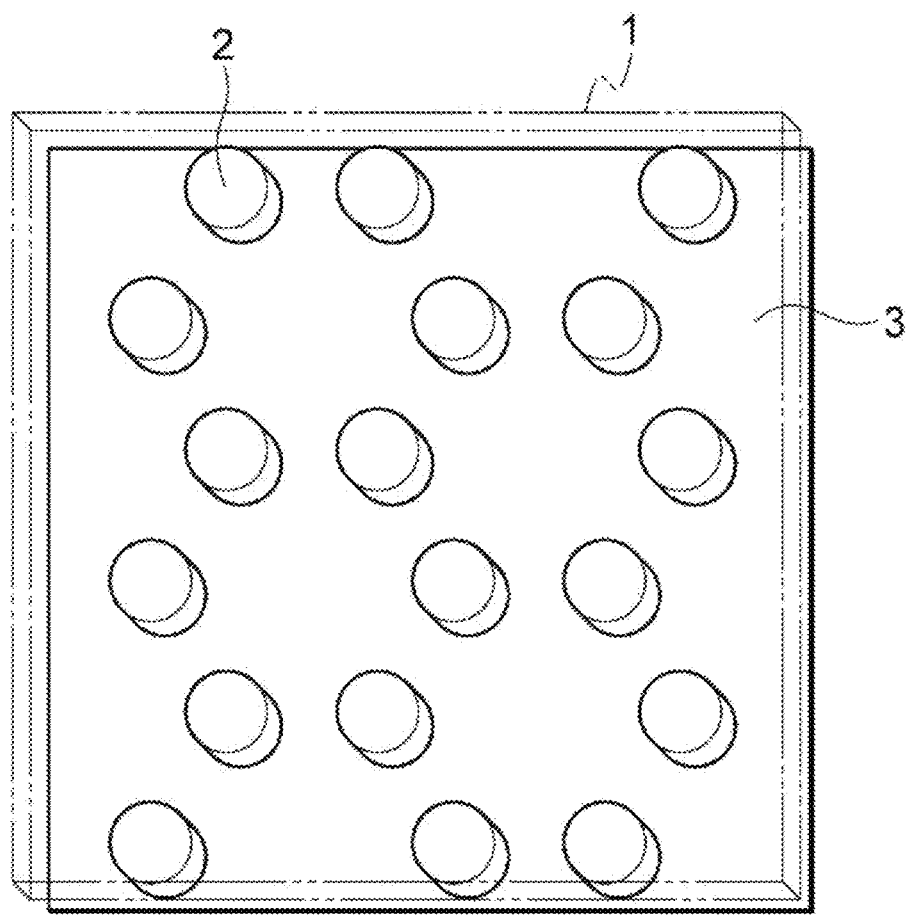
FIG. 3B provides schematic structural views illustrating an adhesive member in which protrusions are arranged with anisotropy.

The arrangement of the protrusions on the base material is not particularly restricted, and the protrusions may be arranged such that, as illustrated in FIG. 3A, adjacent protrusions 2 have substantially regular intervals. The arrangement of the protrusions 2 does not have to be anisotropic as illustrated in FIG. 3A, or may be anisotropic as illustrated in FIG. 3B (hexagonal arrangement in this drawing).

Modification Example 1

Modification Examples of the adhesive member of the present embodiment will now be described. For example, in the adhesive member of Modification Example 1, not only a surface of the surface layer that is on the side opposite to the side facing the uneven shape but also a surface of the base material that is on the side opposite to the side having the uneven shape may each serve as a surface to be adhered with an adherend. In other words, the adhesive member may be configured such that a surface of the surface layer and a surface of the base material both adhere with an adherend. In this case, the surface layer and the base material may be allowed to have a difference in adhesiveness by adjusting a material contained in the surface layer and a material contained in the base material.

Modification Example 2

Figure 4A:
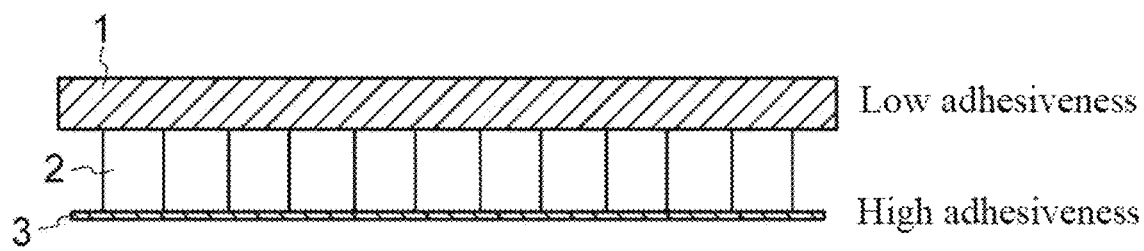
FIG. 4A-4E provide schematic structural views illustrating adhesive members according to modification examples of one embodiment of the invention.

In the adhesive member of Modification Example 2, when it is configured such that a surface (main surface) of the surface layer and a surface (main surface) of the base material both adhere with an adherend, the surface layer 3 and the base material 1 may be allowed to have a difference in adhesiveness by setting the thickness of the surface of the surface layer 3 to be less than the thickness of the surface of the base material 1 as illustrated in FIG. 4A. The adhesion with an adherend tends to be improved by reducing the surface thickness; therefore, in such a configuration as illustrated in FIG. 4A, the surface layer 3 tends to exhibit superior adhesion than the base material 1.

Modification Example 3

Figure 4B:
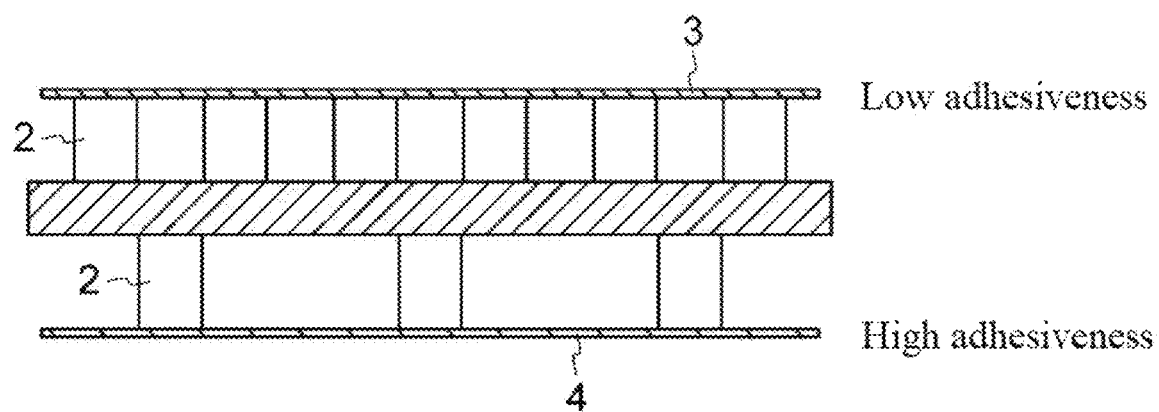

The adhesive member of Modification Example 3 may have a configuration in which, as illustrated in FIG. 4B, an uneven shape is formed on two main surfaces of the base material 1 and the surface layers 3 and 4 covering the uneven shape are arranged on the two respective main surfaces of the base material 1. In this case, the arrangement of the uneven shape on one of the main surface of the base material 1 may be different from the arrangement of the uneven shape on the other main surface of the base material 1, whereby the two surface layers 3 and 4 may be allowed to have a difference in adhesiveness. For example, on the surface layer 4 that is on the side where the protrusions 2 are sparsely arranged with larger gaps therebetween, the adhesion with an adherend tends to be improved as compared to on the surface layer 3 that is on the side where the protrusions 2 are densely arranged with smaller gaps therebetween. Therefore, in such a structure as illustrated in FIG. 4B, the surface layer 4 on the side where the protrusions 2 are sparsely arranged tends to exhibit an improved adhesion with an adherend than the surface layer 3 on the side where the protrusions 2 are densely arranged.

Modification Example 4

Figure 4C:
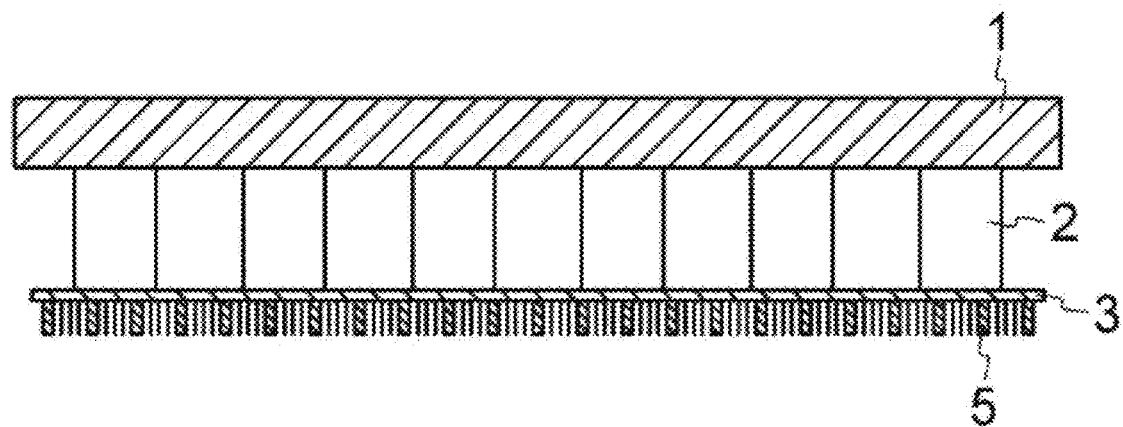

As illustrated in FIG. 4C, the adhesive member of Modification Example 4 may include a surface-processed section 5 where a surface of the surface layer 3 that is on the side coming into contact with an adherend is processed. The surface-processed section 5 preferably has a shape that further improves the adhesion with an adherend, and may have a nanoscale or microscale fine uneven shape or the like. Specifically, the surface-processed section 5 may have such a shape as described in "Nitto Denko Technical Report No. 90, 2009, vol. 47, Gecko Tape Using Carbon Nanotubes".

Modification Example 5

Figure 4D:
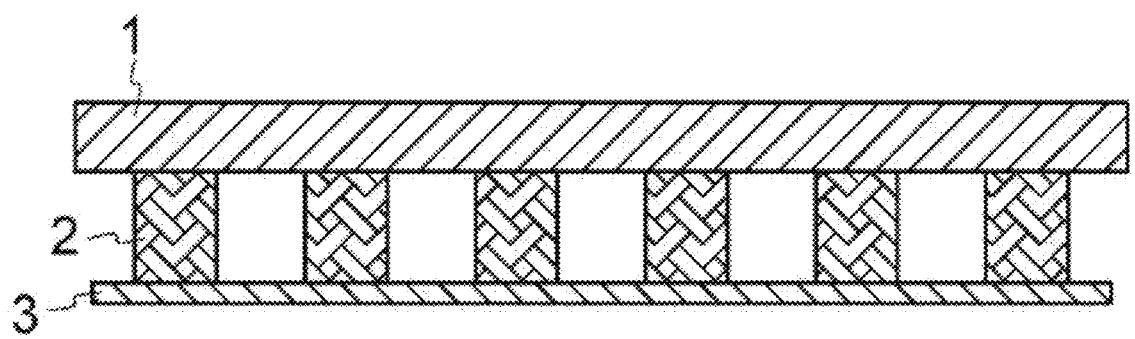

As illustrated in FIG. 4D, the adhesive member of Modification Example 5 may have a configuration in which a material (resin) contained in the base material 1 having an uneven shape and a material (resin) contained in the surface layer 3 are crosslinked. The adhesive member of Modification Example 5 tends to be excellent in heat resistance, durability, mechanical strength, and the like.

Modification Example 6

Figure 4E:
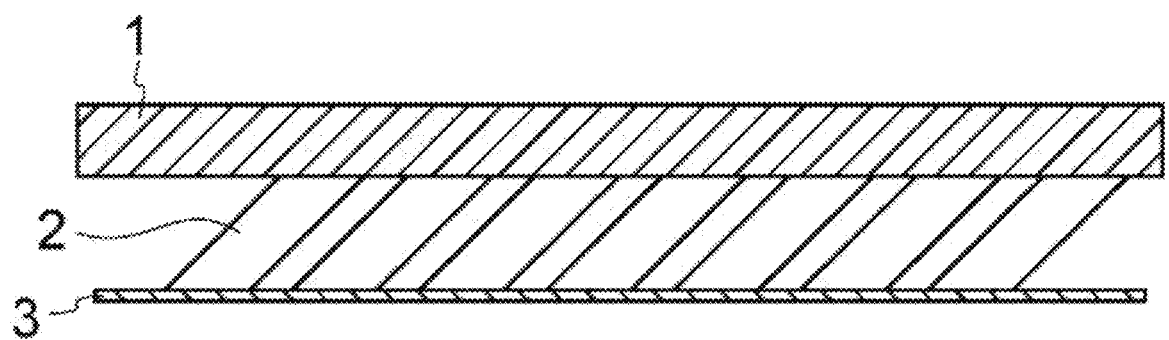

As illustrated in FIG. 4E, the adhesive member of Modification Example 6 may have a configuration in which the central axes of the protrusions 2 on the base material 1 are tilted with respect to the vertical direction. The adhesion with an adherend against a force applied in a specific direction may be improved by imparting the protrusions of the adhesive member with anisotropy.

[Method of Producing Adhesive Member]

A method of producing an adhesive member according to one embodiment of the invention will now be described. A method of producing an adhesive member according to the present embodiment includes the steps of: preparing a base material having an uneven shape on at least one surface; and pasting a surface layer, which covers at least a portion of the surface having the uneven shape on the base material, to the base material.

More specifically, an adhesive member may be produced by preparing a base material having an uneven shape on a surface (e.g., an unevenly-processed film) and a surface layer (e.g., a surface layer film) by known methods and subsequently pasting together the base material and the surface layer such that the uneven shape and the surface layer face each other. A pasting temperature of the base material and the surface layer may be set as appropriate in accordance with the thermal characteristics of the material(s) (e.g., a resin(s)) contained in these members. For example, an adhesive member may be produced by pressing the base material and the surface layer using a roll, a press sheet and the like at a temperature that is 10° C. to 100° C. higher than the glass transition temperature of a resin contained in the base material or a resin contained in the surface layer. Materials of the roll and the press sheet are not particularly restricted, and any of commonly used metals and rubbers can be selected as appropriate in accordance with the pasting conditions.

In the above-described production method, a reverse mode may be employed as well. In other words, an adhesive member may be produced by forming an uneven shape on a surface of the surface layer that is opposite to a surface to be adhered with an adherend and subsequently pasting the base material to the surface layer such that the base material faces the uneven shape.

In the followings, as one example, a method of producing an adhesive member in a case where resins are used as a material contained in the base material and a material contained in the surface layer is described.

<Method of Producing Base Material Having Uneven Shape>

First, a base material having an uneven shape on a surface can be produced by the following steps in accordance with the resin to be used.

When a thermoplastic resin is used as the resin, the production of a base material having an uneven shape on a surface includes: the step of heating a base material to a temperature of not lower than the softening point of the thermoplastic resin contained in the base material (hereinafter, referred to as "step Ia"); the step of pressing a mold having the uneven shape against the thus heated base material and subsequently cooling the base material to a temperature of not higher than the softening point of the thermoplastic resin, preferably a temperature of lower than the softening point (hereinafter, referred to as "step IIa"); and the step of detaching the mold from the thus cooled base material containing the thermoplastic resin (hereinafter, referred to as "step IIIa").

Meanwhile, when a thermosetting resin is used as the resin, the production of a base material having an uneven shape on a surface includes: the step of applying an uncured liquid resin containing the thermosetting resin onto a mold having the uneven shape (hereinafter, referred to as "step Ib"); the step of curing the uncured liquid resin applied onto the mold so as to obtain a base material having the uneven shape (hereinafter, referred to as "step IIb"); and the step of detaching the mold from the thus obtained base material (hereinafter, referred to as "step IIIb").

The above-described method of obtaining a base material having an uneven shape on a surface with the use of either a thermoplastic resin or a thermosetting resin utilizes a molding method so-called thermal imprint method. When a thermoplastic resin is used as the resin, for the purpose of improving the heat resistance, the durability, the mechanical strength and the like of the resulting base material having an uneven shape, the step of crosslinking and curing the resin (step IVa) may be further incorporated as required.

For example, by utilizing a thermal imprint method, fine protrusions can be formed with good precision. In addition, as compared to an injection molding method where a liquid resin is poured into a mold, the time required for the formation of protrusions can be shortened.

(Step Ia)

The step Ia is the step of heating a base material to a temperature of not lower than the softening point of the thermoplastic resin contained in the base material. Examples of a method of heating the base material in the step Ia include a method of heating the base material by bringing it into contact with a plate surface having a high temperature, such as a hot plate; a method of heating the base material by bringing it into contact with a temperature-controlled roll; and a method of heating a feeding base film by applying heat to it.

The base material heated in the step Ia is a member to be processed into the above-described base material having an uneven shape.

As the thermoplastic resin, any of the above-described resins that exhibits thermoplasticity may be used.

The softening point of the thermoplastic resin is a value measured using a thermomechanical analyzer (TMA-50, manufactured by Shimadzu Corporation) and is determined as a TMA softening temperature (softening point) from an intersection of tangent lines of a TMA curve around a glass transition temperature for a test piece that is cut out from the base material containing the thermoplastic resin into a size of 5 mm in width and 15 mm in length and heated from 10° C. to 250° C. at a rate of 5° C./min.

A heating temperature of the base material is not particularly restricted as long as it is not lower than the softening point of the thermoplastic resin contained in the base material; however, a heating temperature that is excessively higher than the softening point causes the thermoplastic resin to shrink at a high ratio when the base material is cooled in the step IIa, and this may make it difficult to obtain a favorable shape accuracy. From this standpoint, the heating temperature of the base material is preferably not higher than the softening point+200° C. of the thermoplastic resin, more preferably not higher than the softening point+100° C. of the thermoplastic resin.

(Step IIa)

The step IIa is the step of pressing a mold having an uneven shape against the base material heated in the step Ia and subsequently cooling the base material to a temperature of not higher than the softening point of the thermoplastic resin, preferably a temperature of lower than the softening point.

In the step IIa, for example, a mold having an uneven shape is pressed against the base material containing the thermoplastic resin that has been heated and softened in the step Ia, and the mold is maintained with a pressure for a certain period, whereby the shape (pattern) of the mold is transferred onto the base material to form an uneven shape corresponding to the shape of the mold on the base material. Alternatively, in the step IIa, by using a temperature-controlled roll holding the above-described mold, it is also possible to soften the thermoplastic resin and transfer the pattern simultaneously. Thereafter, the base material and the mold are cooled to a temperature of not higher than the softening point, whereby the softened thermoplastic resin is solidified.

A pressure at which the mold having an uneven shape is pressed against the base material (pressing pressure) is not particularly restricted and can be set as appropriate in accordance with the situation.

The mold having an uneven shape may be heated in the same manner as the base material containing the thermoplastic resin.

A cooling temperature of the base material is not particularly restricted as long as it is not higher than the softening point of the thermoplastic resin. From the standpoint of moldability, the cooling temperature of the base material is preferably lower than the softening point of the thermoplastic resin by 5° C. or more, more preferably lower than the softening point of the thermoplastic resin by 10° C. or more, still more preferably room temperature.

A material of the mold having an uneven shape is not particularly restricted, and examples thereof include silicon, nickel, and a resin. From the standpoint of forming a fine structure, the mold having an uneven shape is preferably a mold produced by lithography.

(Step IIIa)

The step IIIa is the step of detaching the mold having an uneven shape from the base material containing the thermoplastic resin that has been cooled in the step IIa. By this step, the base material having the uneven shape can be obtained.

In the step IIIa, the base material containing the thermoplastic resin that has been cooled and solidified is detached from the above-described mold. The shape of the mold transferred onto the base material containing the softened thermoplastic resin is maintained by the solidification of the thermoplastic resin through the cooling; therefore, the transferred shape of the mold, i.e. plural protrusions, are formed on a surface of the thus detached base material.

In the step IIIa, when the mold is detached from the base material at a temperature close to the heating temperature without cooling the base material and the mold to a temperature of not higher than the softening point of the thermoplastic resin in the step IIa, since the detachability between the base material and the mold is not sufficient and the resin is easily deformed, the transferred shape may be disrupted. On the other hand, by adequately cooling the base material and the mold to a temperature of not higher than the softening point of the thermoplastic resin before detaching them, not only the shape of the mold is accurately transferred and the dimensional stability is likely to be maintained but also deformation of the protrusions caused by movement and displacement of the base material and the mold during detachment is made less likely to occur, so that excellent moldability is ensured.

(Step IVa)

The step IVa is the step of crosslinking and curing the thermoplastic resin contained in the base material having the uneven shape that has been obtained in the step IIIa. A method of crosslinking and curing the thermoplastic resin is not particularly restricted and may be performed by any known method, such as UV irradiation or heating. The UV wavelength and irradiation dose, the heat-curing temperature, the heating time and the like can be set as appropriate in accordance with the initiator, the crosslinking agent and the like to be used.

(Step Ib)

The step Ib is the step of applying an uncured liquid resin containing a thermosetting resin onto a mold having an uneven shape. Examples of a method of applying the uncured liquid resin containing the thermosetting resin onto the mold in the step Ib include, but not limited to, known coating methods such as spin coating, die coating, slit coating, ink-jet coating, and dip coating.

(Step IIb)

The step IIb is the step of curing the uncured liquid resin applied onto the mold having an uneven shape so as to obtain a base material. In this step, a base material having the uneven shape can be obtained by heating the thermosetting resin contained in the uncured liquid resin to a curing temperature.

A material of the mold having an uneven shape is not particularly restricted, and examples thereof include silicon, nickel, and a resin. As the mold having an uneven shape, from the standpoint of forming a fine structure, it is preferred to use a mold produced by lithography.

(Step IIIb)

The step IIIb is the step of detaching the mold from the thus obtained base material.

The shape of the mold transferred onto the base material containing the cured thermosetting resin is maintained; therefore, the transferred shape of the mold, i.e. plural protrusions, are formed on a surface of the thus detached base material.

(Other Steps)

The method of producing an adhesive member according to the present embodiment may further include, as required, a step(s) other than the above-described ones as long as the effects of the invention are not impaired. Such other steps are not particularly restricted, and may be selected as appropriate in accordance with the intended purpose thereof.

When the adhesive member is in a sheet form, examples of other steps include those performed for the purpose of inhibiting blocking at the time of winding up the adhesive member, such as the step of pasting a mold release film to the adhesive member, and the step of pasting a support or the like onto the surface of the adhesive member that has the uneven shape, or the opposite surface thereof.

<Method of Producing Surface Layer>

The surface layer is produced by a known method. For example, a method of producing the surface layer includes: the step of preparing a liquid resin (hereinafter, referred to as "step i"); the step of applying the thus obtained liquid resin at a desired thickness (hereinafter, referred to as "step ii"); and the step of drying the thus applied liquid resin (hereinafter, referred to as "step iii").

The steps i, ii and iii are described below.

(Step i)

The step i is the step of preparing a liquid resin. In the step i, a liquid resin may be prepared by, for example, dissolving a thermoplastic resin in a known solvent suitable for the thermoplastic resin. In the step i, when a liquid resin is obtained by dissolving a thermoplastic resin in a solvent, the step i may be performed at room temperature or under heating, depending on the solubility of the thermoplastic resin.

This step can be omitted when an uncured liquid thermosetting resin is used.

Examples of the liquid resin include resin-containing resin solutions and resins in a liquid state.

(Step ii)

The step ii is the step of applying the thus obtained liquid resin at a desired thickness. In the step ii, the thus obtained liquid resin may be applied onto an appropriate base material. Examples of a method of applying the liquid resin include, but not limited to, known coating methods such as spin coating, die coating, slit coating, ink-jet coating, and dip coating.

(Step iii)

The step iii is the step of drying the thus applied liquid resin. In this step, as required, the liquid resin may be heated for curing, or may be left to stand at room temperature. Examples of a heating method include known methods, and an air dryer or the like may be used. The step iii can be performed in any desired environment, for example, in an air atmosphere or a nitrogen atmosphere.

EXAMPLES

The invention will now be described more concretely by way of examples thereof; however, the invention is not restricted to the following examples within the gist of the invention.

Example 1

Preparation Example 1 of Unevenly-Processed Film

Preparation of Press Sheet (Base Material):

A thermoplastic resin A-1 (trade name: TAFMER (registered trademark) A-4085S; an α-olefin copolymer manufactured by Mitsui Chemicals, Inc., tensile breaking stress=27 MPa or higher, tensile fracture strain=1,000% or higher (ASTM D638)) was molded into a sheet form using a hydraulic hot-press molding machine (MINI TEST PRESS-10, manufactured by Toyo Seiki Seisaku-sho, Ltd.). The thermoplastic resin A-1 was molded under a pressure of 4 MPa for 30 seconds with the hot-press temperature of the hydraulic hot-press molding machine being set at 120° C., and the hot-press temperature was subsequently lowered to 50° C. so as to cool the resultant under a pressure of 4 MPa for 5 minutes, whereby a press sheet (thickness: 55 μm) was prepared.

Step Ia and Step IIa: The press sheet obtained in the above-described manner was imprint-molded using a nano-imprinting apparatus (NANOIMPRINTER NM-0501, manufactured by Meisyo Kiko Co., Ltd.). The press sheet was heated to 180° C., and a nickel mold (having a lattice-shaped uneven pattern, recess-protrusion height difference: 15 μm, shape of protrusions: cylindrical, width of each protrusion (cylinder diameter): 5 μm, width of recesses (cylinder interval): 5 μm, aspect ratio of protrusions: 3) was pressed against the press sheet at a press pressure of 1 MPa for 60 seconds, after which the press sheet was cooled to room temperature.

Step IIIa: The thus cooled press sheet was peeled off from the nickel mold to obtain an unevenly-processed film.

Preparation Example 1 of Surface Layer Film

A thermoplastic resin A-3 (trade name: TAFMER (registered trademark) PN 3560, an α-olefin-based elastomer manufactured by Mitsui Chemicals, Inc.) was added to toluene and then dissolved with stirring under heating at 80° C. to prepare a 10%-by-mass resin solution of the thermoplastic resin A-3. The thus obtained resin solution was added to petri dishe made of TEFLON (registered trademark) while being heated, and the resultants were dried for 30 minutes in an oven heated to 100° C., whereby a 10 μm-thick surface layer film and a 50 μm-thick surface layer film were each obtained.

[Preparation of Adhesive Tape 1]

A petri dish was heated to 80° C. in a water bath, the surface having an uneven shape of the above-obtained unevenly-processed film was arranged to face the thus obtained 10 μm-thick surface layer film, and the unevenly-processed film was pasted to the surface layer film softened by heating. The resultant was left to cool at room temperature and peeled off from the petri dish after 6 hours, whereby a desired adhesive tape 1 (having a hollow uneven shape) was obtained.

Comparative Example 1

For comparison, the press sheet (thickness: 55 μm) obtained in the above-described "Preparation of Press Sheet (Base Material)" was used as a comparative adhesive tape 1.

Comparative Example 2

In the "Preparation of Adhesive Tape 1" of Example 1, in place of the unevenly-processed film, the press sheet (thickness: 55 μm) obtained in the above-described "Preparation of Press Sheet (Base Material)" was pasted to the 10 μm-thick surface layer film softened by heating. The resultant was left to cool at room temperature and peeled off from the petri dish after 6 hours, whereby a comparative adhesive tape 2 was obtained.

[Measurement of Tackiness]

The press sheet made of the thermoplastic resin A-1, which was obtained in the above-described "Preparation of Press Sheet (Base Material)", and the 50 μm-thick surface layer film made of the thermoplastic resin A-3, which was obtained in the above-described "Preparation Example 1 of Surface Layer Film", were each cut out into the form of a strip of 2.5 cm in width and 7 cm in length, and the thus obtained strips were used as test pieces.

For the measurement, a tackiness tester (TAC-II, manufactured by Rhesca Corporation) was used. At room temperature (25° C.), a cylindrical stainless-steel probe of 5 mm in diameter was brought into contact with the surface of each test piece at a rate of 120 mm/min, and a load of 200 N/cm$^2$ was applied for 1 second, after which the probe was pulled away in the vertical direction at a rate of 120 mm/min. In this process, the resistance value (load value) received by the probe was measured to determine the tackiness at 25° C. of the thermoplastic resin A-1 and that of the thermoplastic resin A-3. The results thereof are shown in Table 1.

[Measurement of Storage Elastic Modulus E']

The press sheet made of the thermoplastic resin A-1, which was obtained in the above-described "Preparation of Press Sheet (Base Material)", and the 50 μm-thick surface layer film made of the thermoplastic resin A-3, which was obtained in the above-described "Preparation Example 1 of Surface Layer Film", were each cut out into the form of a strip of 3 mm in width and 5 cm in length, and the thus obtained strips were used as test pieces.

For the measurement, a solid viscoelasticity analyzer (RSA-III, manufactured by TA Instruments Japan Inc.) was used. Each test piece was set on a fixture at a chuck distance of 20 mm and, under a nitrogen environment, the storage elastic modulus E' was measured in the tensile mode at a measurement frequency of 1 Hz while raising the temperature from −50° C. to 100° C. at a rate of 3° C./min, whereby the storage elastic modulus E' at 25° C. of the thermoplastic resin A-1 and that of the thermoplastic resin A-3 were determined. The results thereof are shown in Table 1.

[Measurement of Softening Point]

The press sheet made of the thermoplastic resin A-1, which was obtained in the above-described "Preparation of Press Sheet (Base Material)", and the 50 μm-thick surface layer film made of the thermoplastic resin A-3, which was obtained in the above-described "Preparation Example 1 of Surface Layer Film", were each cut out into a size of 5 mm in width and 15 mm in length and used as test pieces.

For the measurement, a thermomechanical analyzer (TMA-50, manufactured by Shimadzu Corporation) was used. Each test piece was heated from 10° C. to 250° C. at a rate of 5° C./min and, from an intersection of tangent lines of a thermomechanical analysis (TMA) curve around a glass transition temperature, the TMA softening temperature (softening point) of the thermoplastic resin A-1 and that of the thermoplastic resin A-3 were each determined. The results thereof are shown in Table 1.

[Measurement of Adhesive Strength]
• 180° Peeling

At 23° C., each of the above-obtained adhesive tapes was pasted, via its adhesive surface, onto an SUS304-BA plate (prescribed in JIS G-4305(2012), length: 20 cm, width: 5 cm) and left to stand for 1 hour. Thereafter, one end of the adhesive tape was pinched, and the adhesive tape was peeled off from the surface of the SUS304-BA plate at a peeling angle of 180° and a peeling rate of 300 mm/min. The stress in this peeling process was measured and converted into N/25 mm to determine the adhesive strength. Other conditions were set in accordance with JIS Z-0237(2009).

• Shear Force (0° Peeling)

Each adhesive tape was peeled off from the surface of the SUS304-BA plate at a peeling rate of 300 mm/min, with the peeling angle in the above-described 180° peeling being changed to 0°. The stress in this peeling process was measured to determine the shear force.

Step IIIb: The thus heat-cured silicone resin coating film was cooled to room temperature and subsequently peeled off from the nickel mold, whereby a silicone resin-containing unevenly-processed film (thickness: 55 μm) was obtained.

Preparation Example 2 of Surface Layer Film

A silicon resin (SIM240; manufactured by Shin-Etsu Chemical Co., Ltd.) was spin-coated onto a silicon wafer to obtain an uncured silicone resin-containing surface layer film of 10 μm in thickness.

[Preparation of Adhesive Tape 2]

The surface having an uneven shape of the above-obtained silicone resin-containing unevenly-processed film was arranged to face the thus obtained silicone resin-containing surface layer film, and the unevenly-processed film was pasted to the surface layer film. The resultant was left to stand at room temperature for 24 hours, and the silicon wafer was subsequently peeled off, whereby a desired adhesive tape 2 (having a hollow uneven shape) was obtained.

Comparative Example 3

In Example 2, using a 10 cm-square smooth nickel plate in place of the nickel mold in the "Preparation Example 2 of Unevenly-Processed Film", the silicone resin was applied onto the smooth nickel plate, and the resultant was heated under the same conditions as in the above-described step IIb to prepare a silicone resin sheet (thickness: 55 μm). With omission of the subsequent "Preparation Example 2 of Surface Layer Film" and "Preparation of Adhesive Tape 2", a comparative adhesive tape 3 having a smooth surface was obtained.

TABLE 1

| | Base material | | | Surface layer | | | | Adhesive strength of adhesive tape | |
|---|---|---|---|---|---|---|---|---|---|
| | Tackiness [N/cm$^2$] | E' [MPa] | Softening point [° C.] | Tackiness [N/cm$^2$] | E' [MPa] | Softening point [° C.] | Tape surface processing shape | 180° peeling [N/25 mm] | Shear force [N/cm$^2$] |
| Example 1 | 0.4 | 28 | 66 | 6.7 | 12 | 135 | with hollow uneven shape | 0.075 | 3.4 |
| Comparative Example 1 | | | | no surface layer | | | no processing | 0.025 | 1.1 |
| Comparative Example 2 | | | | 6.7 | 12 | 135 | no processing | 0.025 | 1.3 |

Example 2

Preparation Example 2 of Unevenly-Processed Film

Step Ib: A silicone resin (SIM240; manufactured by Shin-Etsu Chemical Co., Ltd.) and a curing agent (CAT-240; manufactured by Shin-Etsu Chemical Co., Ltd.) were weighed at a ratio of 10:1, stirred together and then degassed to prepare a resin composition. The thus obtained resin composition was spin-coated onto a nickel mold (having a lattice-shaped uneven pattern, recess-protrusion height difference: 15 shape of protrusions: cylindrical, width of each protrusion (cylinder diameter): 5 width of recesses (cylinder interval): 5 aspect ratio of protrusions: 3).

Step IIb: The uncured silicone resin coating film on the nickel mold, which was obtained in the above-described step Ib, was heat-cured for 30 minutes in an oven set at 150° C.

Comparative Example 4

In Example 2, a silicone resin-containing unevenly-processed film (thickness: 55 μm) was prepared in the "Preparation Example 2 of Unevenly-Processed Film" and, with omission of the subsequent "Preparation Example 2 of Surface Layer Film" and "Preparation of Adhesive Tape 2", a comparative adhesive tape 4 having cylindrical shapes on a surface was obtained.

Comparative Example 5

A comparative adhesive tape 5 having mushroom shapes on a surface was obtained by performing the following operations in place of the operations of "Preparation of Adhesive Tape 2" in Example 2.

Protrusions of the silicone resin-containing unevenly-processed film (thickness: 55 μm) and the uncured silicone resin-containing surface layer film were brought into contact with each other so as to adhere the uncured liquid silicone resin to the protrusions. Immediately thereafter, the protrusions thus adhered with the uncured liquid silicone resin were left to stand for 24 hours in contact with a clean surface of a silicon wafer mirror that had been separately prepared. The silicon wafer was subsequently peeled off to obtain the comparative adhesive tape 5 having mushroom shapes.

Figure 5:
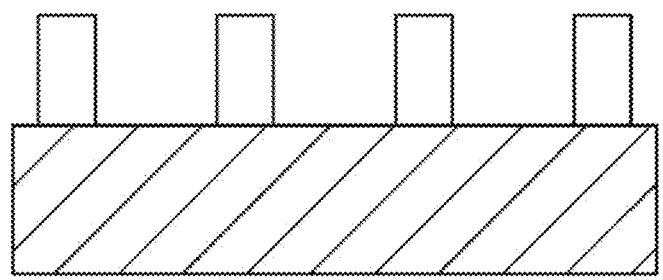
FIG. 5 provides schematic structural views illustrating comparative adhesive tapes 4 and 5 of Comparative Examples 4 and 5, respectively.
Figure 5:
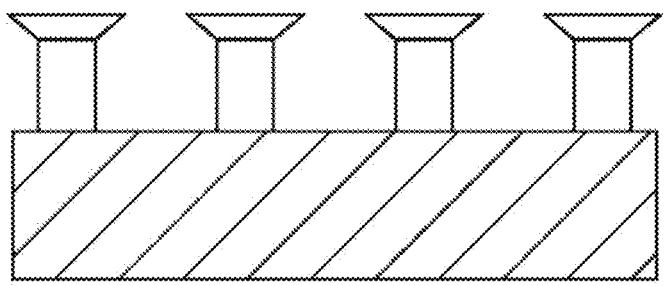

FIG. 5 illustrates the comparative adhesive tapes 4 and 5 of Comparative Examples 4 and 5.

Further, using the silicone resin sheet (thickness: 55 μm) prepared in Comparative Example 3, the properties of a raw material sheet (tackiness and storage elastic modulus E') were measured in the same manner as in Example 1.

The adhesive strength was also measured in the same manner as in Example 1 and Comparative Example 1 for the adhesive tape 2 of Example 2 and the comparative adhesive tapes 3 to 5 of Comparative Examples 3 to 5.

The results thereof are shown in Table 2.

TABLE 2

|  | Base material | | Surface layer | | Tape surface processing shape | Adhesive strength of adhesive tape | |
|---|---|---|---|---|---|---|---|
|  | Tackiness [N/cm$^2$] | E' [MPa] | Tackiness [° C.] | E' [MPa] |  | 180° peeling [N/25 mm] | Shear force [N/cm$^2$] |
| Example 2 | 0.37 | 1.7 | 0.37 | 1.7 | with hollow uneven shape | 0.04 | 0.83 |
| Comparative Example 3 |  |  | no surface layer |  | no processing | <0.001 | 0.37 |
| Comparative Example 4 |  |  | no surface layer |  | cylindrical shape | <0.001 | 0.15 |
| Comparative Example 5 |  |  | 0.37 | 1.7 | mushroom shape | <0.001 | 0.38 |

As shown in Tables 1 and 2, as compared to the comparative adhesive tapes 1 to 5 of Comparative Examples 1 to 5, the adhesive tapes 1 and 2 of Examples 1 and 2 having a hollow uneven shape exhibited superior adhesion with the adherend (particularly, silicon).

The disclosure of Japanese Patent Application No. 2017-141173 filed on Jul. 20, 2017, is hereby incorporated by reference in its entirety.

All the documents, patent applications and technical standards that are described in the present specification are hereby incorporated by reference to the same extent as if each individual document, patent application or technical standard is concretely and individually described to be incorporated by reference.

DESCRIPTION OF SYMBOLS

1: base material
2: protrusion
3, 4: surface layer
5: surface-processed section
6: recess

The invention claimed is:

1. An adhesive member comprising:
   a base material having an uneven shape on at least one surface; and
   a surface layer covering at least a portion of the surface having the uneven shape on the base material,
   wherein a storage elastic modulus of the surface layer is less than a storage elastic modulus of the base material.

2. The adhesive member according to claim 1, wherein the surface layer and the base material have a storage elastic modulus of from 1 MPa to 1 GPa.

3. The adhesive member according to claim 1, wherein the surface layer and the base material have a tackiness of 25 N/cm$^2$ or less.

4. The adhesive member according to claim 1, being in the form of a tape, a sheet, or a film.

5. The adhesive member according to claim 1, wherein:
   the uneven shape is configured by plural protrusions and regions between two adjacent protrusions of the plural protrusions, a ratio of a height of each of the protrusions with respect to a width of each of the protrusions (height of each of the protrusions/width of each of the protrusions) is from 1 to 15,
   the surface layer is arranged over tips of the plural protrusions on the base material,
   the surface layer is a continuous layer,
   a bottom surface between the two adjacent protrusions of the plural protrusions, and a surface of the surface layer that is on a side facing the bottom surface, have a space therebetween, and
   in a case in which the plural protrusions have a mushroom shape, the surface layer is arranged on the tips of the plural protrusions.

6. The adhesive member according to claim 1, wherein a ratio of the height of each of the protrusions on the base material with respect to a thickness of the surface layer (height of each of the protrusions/thickness of surface layer) is from 0.2 to 1,000.

7. The adhesive member according to claim 1, wherein a thickness of the surface layer is from 0.1 μm to 50 μm.

8. The adhesive member according to claim 1, wherein the width of each of the protrusions on the base material is from 0.1 μm to 200 μm.

9. The adhesive member according to claim 1, wherein a distance between the adjacent protrusions on the base material is from 0.1 μm to 500 μm.

10. The adhesive member according to claim 1, wherein the height of each of the protrusions on the base material is from 0.1 μm to 200 μm.

11. The adhesive member according to claim 1, wherein the base material and the surface layer comprise the same material.

12. A method of producing the adhesive member according to claim 1, the method comprising:
   preparing a base material having an uneven shape on at least one surface; and
   pasting a surface layer, which covers at least a portion of the surface having the uneven shape on the base material, to the base material.

* * * * *